United States Patent
Van Dingenen et al.

(10) Patent No.: US 11,441,645 B2
(45) Date of Patent: Sep. 13, 2022

(54) VEHICLE TRANSMISSION AND METHOD FOR OPERATION OF SAID TRANSMISSION

(71) Applicant: Dana Belgium N.V., Bruges (BE)

(72) Inventors: Joachim Van Dingenen, Drongen (BE); Jessica Versini, Bruges (BE); Dries Verstraete, Ronsele (BE); Bert Hannon, Bruges (BE)

(73) Assignee: Dana Belgium N.V., Bruges (BE)

(*) Notice: Subject to any disclaimer, the term of this patent is extended or adjusted under 35 U.S.C. 154(b) by 42 days.

(21) Appl. No.: 16/882,152

(22) Filed: May 22, 2020

(65) Prior Publication Data

US 2021/0364065 A1 Nov. 25, 2021

(51) Int. Cl.
 *F16H 3/72* (2006.01)
 *F16H 3/76* (2006.01)
 *F16H 3/58* (2006.01)

(52) U.S. Cl.
 CPC .............. *F16H 3/727* (2013.01); *F16H 3/58* (2013.01); *F16H 3/76* (2013.01); *F16H 2200/2007* (2013.01); *F16H 2200/2041* (2013.01); *F16H 2716/08* (2013.01)

(58) Field of Classification Search
 CPC ... F16H 3/727; F16H 3/58; F16H 3/76; F16H 2200/2007; F16H 2200/2041; F16H 2716/08
 See application file for complete search history.

(56) References Cited

U.S. PATENT DOCUMENTS

| | | |
|---|---|---|
| 4,860,612 A | 8/1989 | Dick et al. |
| 6,533,693 B2 | 3/2003 | Bowen et al. |
| 8,215,440 B2 | 7/2012 | Hoffmann et al. |
| 9,650,032 B2 | 5/2017 | Kotloski et al. |
| 10,023,184 B2 | 7/2018 | Hartz et al. |
| 10,160,438 B2 | 12/2018 | Shukla et al. |
| 10,392,000 B2 | 8/2019 | Shukla et al. |
| 10,457,134 B2 | 10/2019 | Marrow et al. |
| 10,807,466 B1* | 10/2020 | Haka ................. B60K 17/02 |
| 2002/0088291 A1 | 7/2002 | Bowen |
| 2007/0170030 A1 | 7/2007 | Yamazaki et al. |
| 2011/0179906 A1 | 7/2011 | Juenemann et al. |
| 2014/0243145 A1* | 8/2014 | Iwasa ..................... F16H 3/727 475/331 |
| 2015/0105200 A1* | 4/2015 | Duhaime ............... B60K 6/383 475/5 |
| 2015/0119191 A1* | 4/2015 | Lee ...................... F16H 3/727 180/65.265 |

(Continued)

FOREIGN PATENT DOCUMENTS

| | | |
|---|---|---|
| WO | 2009147501 A2 | 12/2009 |
| WO | 2017049049 A1 | 3/2017 |

*Primary Examiner* — Colby M Hansen
(74) *Attorney, Agent, or Firm* — McCoy Russell LLP

(57) ABSTRACT

Methods and systems for a vehicle transmission are provided. In one example, a vehicle transmission system includes a first planetary gear set rotationally coupled to a second planetary gear set and a first electrical machine rotationally coupled to a gear in the first planetary gear set. The vehicle transmission system further includes a second electrical machine rotationally coupled to a gear in the second planetary gear set and a first clutch configured to selectively disconnect the first and second planetary gear sets from a drive axle.

15 Claims, 3 Drawing Sheets

(56) References Cited

U.S. PATENT DOCUMENTS

| | | | |
|---|---|---|---|
| 2015/0258978 A1* | 9/2015 | Shiratori | B60W 10/06 180/65.265 |
| 2015/0298682 A1* | 10/2015 | Hata | B60W 10/02 180/65.265 |
| 2018/0031085 A1 | 2/2018 | Steinberger et al. | |
| 2018/0326832 A1 | 11/2018 | Kotloski et al. | |
| 2019/0178350 A1 | 6/2019 | Steinberger et al. | |
| 2019/0242460 A1 | 8/2019 | Morrow et al. | |
| 2019/0291711 A1 | 9/2019 | Shukla et al. | |
| 2019/0381990 A1 | 12/2019 | Shukla et al. | |

* cited by examiner

VEHICLE TRANSMISSION AND METHOD FOR OPERATION OF SAID TRANSMISSION

FIELD

The present disclosure relates to a transmission in a vehicle and methods for operating the vehicle transmission.

BACKGROUND

Vehicle transmissions deliver torque to vehicle drive axles. Infinitely variable style transmissions specifically provide gear ratio adjustment continuity in some vehicles. These transmissions have a relatively high degree of adaptability and allow for the control of the input speed independent from the output speed.

However, several drawbacks with vehicle transmissions, and more specifically, infinitely variable transmissions in hybrid or battery electric vehicles (BEVs) have been recognized by the inventors. For example, previous vehicles have relied on inverters to bring electric motors in the driveline to a zero-torque state to, for example, prevent unwanted vehicle movement caused by the unplanned release of battery power to the electric motors. Inverters designed to bring the motor to a zero-torque state may be complex. Utilizing inverters capable of bringing the motor to a zero-torque state in a vehicle may consequently run-up production costs.

SUMMARY

To overcome at least some of the aforementioned drawbacks a vehicle transmission system is provided. The vehicle transmission system includes, in one example, a first planetary gear set rotationally coupled to a second planetary gear set. The vehicle transmission system further includes a first electrical machine rotationally coupled to a gear in the first planetary gear set and a second electrical machine rotationally coupled to a gear in the second planetary gear. The transmission system also includes a clutch configured to selectively disconnect the first and second planetary gear sets from a drive axle. The clutch can therefore interrupt power flow from the transmission to the drive axle, during certain conditions. The clutch may, as a result, be used to place the transmission in a neutral state when wanted, thereby expanding transmission capabilities.

In another example, the vehicle transmission system may further comprise a controller including executable instructions stored in non-transitory memory that, during a first operating condition, cause the controller to: operate the first clutch to disconnect the first and second planetary gear sets from the drive axle. In this way, the transmission output may be brought to a zero-torque state without operation of an inverter electrically coupled to the first and second electrical machines, if desired. As such, the chance of unwanted power flow between the transmission and the driveline may be reduced. Thus, in one example, disconnecting the clutch may allow unwanted vehicle movement due to the unexpected release of battery power to the electrical machines or unwanted power transfer from the engine to the driveline to be avoided. In another example, disconnecting the clutch may allow the occurrence of unwanted braking force due to mechanical degradation to be avoided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A vehicle transmission with multiple planetary gear sets designed with a comparatively high degree of gear ratio variation for a vehicle drive axle is described herein. The transmission may for instance be an electro-mechanical infinitely variable transmission (EMIVT) designed to provide a neutral state and a continuous ratio change with regard to input-to-output speed, in one example. EMIVTs allow for improved (e.g., optimal) operation of the primary drivers (e.g., the internal combustion engine and the electric machines) so as to increase vehicle fuel economy and/or performance, if desired. Vehicle efficiency is correspondingly increased. The transmission, in one example, may include a clutch (e.g., neutral clutch) designed to disconnect a first and second planetary gear set from a drive axle during certain operating conditions. The planetary gear sets are each designed to transfer rotational energy to and receive rotational energy from electrical machines. The clutch therefore allows the power flowing to the vehicle's driveline from the transmission to be interrupted. Consequently, the system may be efficiently placed in a neutral arrangement to reduce the chance of (e.g., avoid) unwanted power flow between the driveline and the transmission. For instance, as a non-limiting example, the neutral clutch may allow for a reduction in the chance of unwanted vehicle motion caused by the unwanted release of electrical energy from the energy storage device to the electric machines. In another non-limiting example, the neutral clutch may allow the likelihood of unwanted power transfer between the internal combustion engine and the driveline to be decreased. In yet another non-limiting example, the neutral clutch may allow the chance of unwanted braking force occurring due to mechanical degradation to be reduced. The transmission may include, in another example, a mechanical power take-off (PTO) rotationally coupled to the second planetary gear set in the transmission and an electrical PTO coupled to the inverter. Providing multiple PTOs in the transmission increases transmission adaptability. For instance, the mechanical PTO and the electrical PTO may power accessories with different rotational input needs. Consequently, two accessories may be efficiently driven by the transmission in tandem, in some embodiments.

Figure 1:
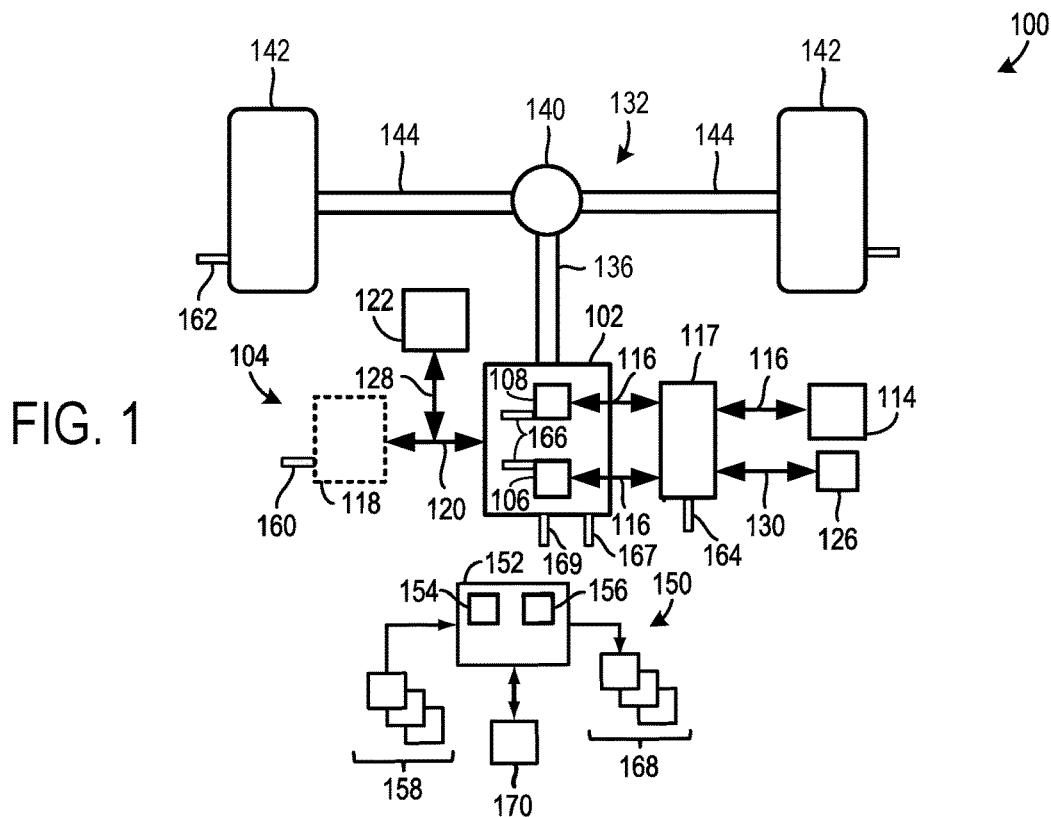
FIG. 1 is a schematic representation of a vehicle including a transmission.
Figure 2:
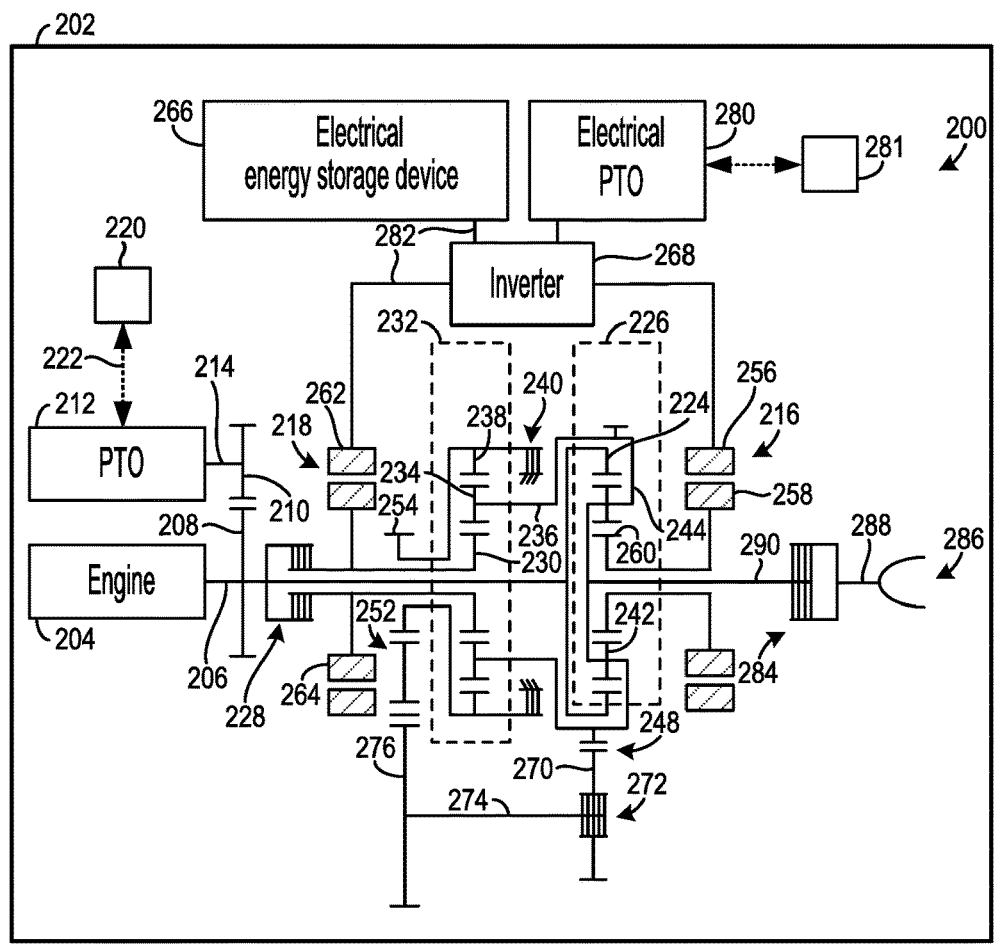
FIG. 2 shows a stick diagram of a first embodiment of a vehicle transmission system.
Figure 3:
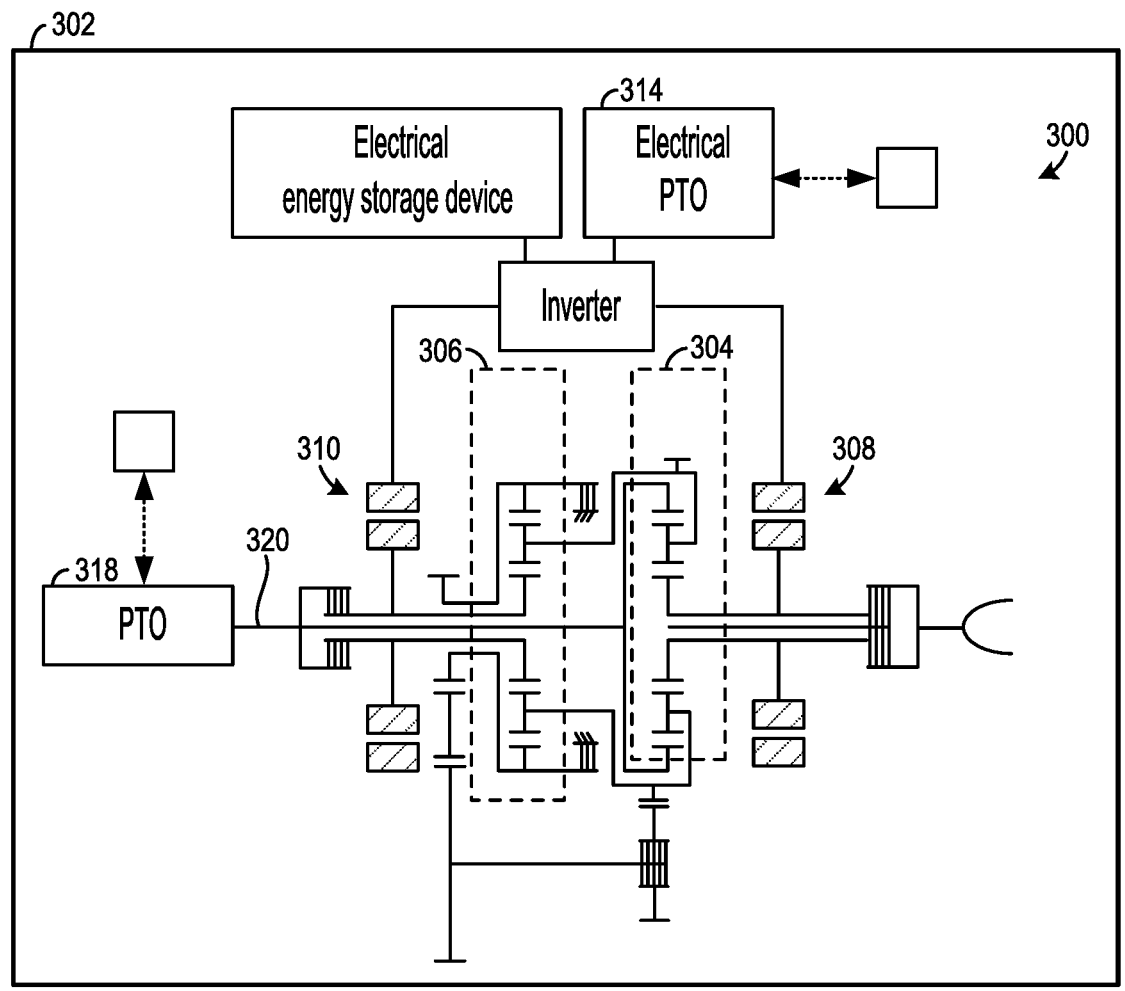
FIG. 3 shows a stick diagram of a second embodiment of a vehicle transmission system.
Figure 4:
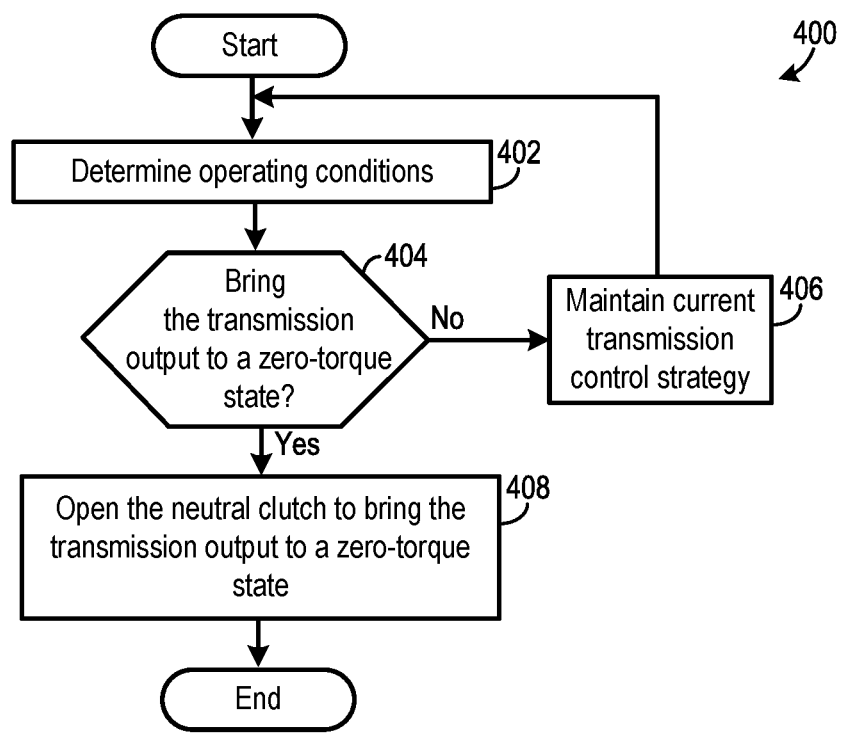
FIG. 4 shows a method for operation of a vehicle transmission system.

FIG. 1 illustrates a high-level schematic illustration of a vehicle with a transmission having a relatively high speed variance adjustability. FIG. 2 depicts a stick diagram of a first example of a transmission system in a hybrid vehicle a clutch designed to disconnect the transmission from a drive axle. FIG. 3 depicts a stick diagram of a second example of a transmission system in a battery electric vehicle (BEV)

again with a clutch designed to interrupt the power transfer between the transmission to the drive axle. FIG. 4 illustrates a method for operating a transmission system to place the transmission's output in a zero-torque state during certain operating conditions.

FIG. 1 shows a schematic depiction of a vehicle 100 including a transmission 102 in a transmission system 104. The transmission 102 may be an EMIVT designed to provide an infinite input-output rotational speed variance, in one example. To achieve this infinite speed variance functionality the EMIVT may include a pair of planetary gear sets, two electrical machines, and a plurality of clutches, described in greater detail herein with regard to FIG. 2.

The transmission 102 may further include a first electrical machine 106 and a second electrical machine 108, each designed to provide rotational energy to and/or receive rotational energy from planetary gear sets, described in greater detail herein. To accomplish the aforementioned rotational energy transfer functionality, the first and second electrical machines 106, 108 may include rotors and stators electromagnetically interacting with one another to generate a rotational output and/or generate electrical energy responsive to receiving input from the planetary gear sets. Thus, the electrical machines may be motor-generators, in one example. Specific exemplary configurations of the electrical machines are described in greater detail herein with regard to FIG. 2. As described herein the term exemplary is not intended to give any indication of preference but rather indicates one potential aspect of the corresponding feature.

It will be understood that the first and second electrical machines 106, 108 may be operated in different modes where the clutches are in different states. For instance, in one use-case example, the clutches may be designed to place the transmission in an ultra-low, a low, a mid, and a high mode. As such, these transmission modes delineate transmission level. However, in other examples, the electrical machines may be designed to operate in additional modes.

The first and second electrical machines 106, 108 may optionally be electrically coupled to an electrical energy storage device 114 (e.g., battery, capacitor, combinations thereof, and the like). Arrows 116 denote the electrical energy transfer between the electrical energy storage device 114, an inverter 117, and the electrical machines 106, 108. It will be appreciated that wired and/or wireless energy transfer devices may be used to accomplish this electrical energy transfer. To elaborate, electrical components such as the inverter 117, wires (e.g., high voltage wires), and the like may enable electrical energy transfer between the first and second electrical machines 106, 108 and the electrical energy storage device 114.

The vehicle 100 may also include an internal combustion engine 118 designed to transfer rotational energy to the transmission 102 and/or receive rotational energy from the transmission. Arrow 120 denotes said rotational energy transfer. The internal combustion engine 118 may include conventional components designed to carry out combustion cycles (e.g., four stroke combustion cycles) including one or more cylinders, an intake system, an exhaust system, valves, a fuel delivery system, an emission control system, etc. Both compression and spark ignition engines have been contemplated.

The vehicle 100 may take a variety of forms, in different embodiments. For example, the vehicle 100 may be a hybrid vehicle where both the first and second electrical machines 106, 108 and the internal combustion engine 118 are used for motive power generation. For instance, in one use-case hybrid vehicle configuration, the internal combustion engine 118 may assist in recharging the electrical energy storage device 114, during certain conditions. In another use-case hybrid vehicle configuration, the internal combustion engine may provide rotational energy to wheels 142. Further, in such an example, the electrical machines 106, 108 may provide rotational energy to the wheels 142 in tandem with the engine 118, or at distinct time intervals, in another example. Further, in other examples, the vehicle may be a battery electric vehicle (BEV) where the internal combustion engine is omitted.

The transmission 102 is designed to receive power input from the internal combustion engine 118 and the electrical energy storage device 114 by way of the first and second electrical machines 106, 108. Additionally, the transmission 102 may be designed to output power to a mechanical PTO 122 and/or and electrical PTO 126. However, in other examples, the transmission system 104 may include additional PTOs or may omit the mechanical PTO or the electrical PTO. It will be appreciated that the power flows between the engine 118, the first electrical machine 106, the second electrical machine 108, the mechanical PTO 122, and the electrical PTO 126 may also be zero and reversible, in certain embodiments. In other words, power can be taken from the transmission's outputs as well as sent back to the engine and electrical machines, in some cases. The forward and reversible power transfer between the mechanical PTO 122 and the corresponding components is denoted via arrow 128. Gears, clutches, and/or other suitable power transfer mechanisms may be deployed to carry out the mechanical power transfer. The forward and reverse power transfer between the electrical PTO 126 and the electrical machines 106, 108 is denoted via arrows 130. Cables, circuits, etc. may be used for this electrical power transfer.

The transmission 102 is designed to transfer rotational energy to and/or receive rotational energy from a drive axle 132. Specifically in one example, a transfer case may be arranged at the output of the transmission and is designed to direct power to both front and rear axles. In addition, the transfer case may include disconnect clutches or an inter-axle differential. It will be appreciated that the drive axle may be a front or a rear axle. The drive axle 132 may include a differential 140 transferring rotational energy between the transmission 102 and the wheels 142 via the axle shafts 144. A variety of suitable differential styles have been envisioned such as a locking differential, limited slip differential, torque vectoring differential, etc.

The vehicle 100 may also include a control system 150 with a controller 152. The controller 152 includes at least one processor 154 and memory 156. The memory 156 may hold instructions stored therein that when executed by the processor cause the controller 152 to perform the various methods, control techniques, etc., described herein. The processor 154 may comprise a microprocessor unit and/or other types of circuits. The memory 156 may include known data storage mediums such as random access memory, read only memory, keep alive memory, combinations thereof, etc. Furthermore, it will also be understood that the memory 156 may include non-transitory memory.

The controller 152 may receive various signals from sensors 158 coupled to various locations in the vehicle 100 and the transmission 102. The sensors may include an engine speed sensor 160, wheel speed sensors 162, energy storage device state of charge sensor 164, electrical machine speed sensors 166, pressure sensor 167, temperature sensor 169, etc. The controller 152 may also send control signals to various actuators 168 coupled at different locations in the vehicle 100 and the transmission 102. For instance, the controller 152 may send signals to clutches in the transmission 102, described in greater detail herein, to adjust the transmission's configuration and place the transmission in different operating modes. Specifically, in one use-case example, the controller 152 may comprise instructions stored in the memory 156 causing the controller 152 to transition the transmission into one of an ultra-low, a low, a mid, or a high level mode. The other controllable components in the vehicle 100 and transmission 102 may function in a similar manner with regard to command signals and actuator adjustment. The controller 152 may include instructions stored in non-transitory memory to carry out the methods, control techniques, etc., described in greater detail herein.

The vehicle 100 may also include an input device 170 (e.g., a gear selector such as a gear stick, gear lever, etc., a brake pedal, an accelerator pedal, a console instrument panel, a touch interface, a touch panel, a keyboard, combinations thereof, etc.). The input device 170, responsive to driver input, may generate a mode request indicating a desired operating mode for the transmission. For instance, in a use-case example, the driver may shift the input device into a drive mode to generate a gear set modal transition request at the controller. In response, the controller 152 commands transmission components to push power to the drive axle 132. However, in other examples, the vehicle transmission 102 may be adjusted using more automated control strategies.

FIG. 2 shows a transmission system 200 in a vehicle 202. It will be appreciated that the transmission system 200, shown in FIG. 2, serves as an example of the transmission system 104 and the vehicle 100 shown in FIG. 1. As such, at least a portion of the functional and structural features of the transmission system 104 shown in FIG. 1 may be embodied in the transmission system 200 shown in FIG. 2 or vice versa. Thus, the controller 152, shown in FIG. 1, may be included in the transmission system, shown in FIG. 2 and the other systems described herein, and send control commands to the controllable components and receive inputs from sensors and other system components.

The transmission system 200 may include an internal combustion engine 204 designed to implement combustion cycles and therefore may include conventional components such as cylinder(s), piston(s), valves, an intake system, an exhaust system, etc., generating rotational output or receiving rotational input from a first shaft 206. A first gear 208 may be rotationally coupled to the first shaft 206. As described herein, a gear is a rotating device that includes teeth meshing or otherwise rotationally coupling with teeth in a corresponding gear. The transmission system 200 may also include a second gear 210 rotational coupled to the first gear 208. The second gear 210 may provide input for a mechanical PTO 212 via a PTO shaft 214 (e.g., countershaft). Further, in some examples, the mechanical PTO 212 may be configured to deliver rotational input to the engine 204 and/or a first and a second electrical machine 216, 218. The mechanical PTO 212 may also be designed to rotationally decouple from the engine 204 and/or electrical machines 216, 218. Thus, the mechanical PTO 212 may include a disconnect clutch, in one example. The mechanical PTO disconnect clutch may be actuated via pneumatic, hydraulic, mechanical, and/or electric mechanisms, for instance. The mechanical PTO 212 may include suitable components for delivering power to the accessories 220 such as a shaft, in one example, or other suitable mechanical components, in other examples. The shaft may be coupled to a hydraulic pump delivering pressurized fluid (e.g., oil) for auxiliary functions. The ratio between the first and second gears 208, 210 may provide a desired speed change as an input for the mechanical PTO.

The mechanical PTO 212 may be rotationally coupled to one or more accessories 220, denoted via arrow 222. The accessories 220 may include a hydraulic pump, an electro-motor/alternator, and the like. Additionally, the mechanical PTO 212 is shown directly coupled to the engine 204 via the first and second gears 208, 210 without any intervening components therebetween, in the illustrated example. Arranging the mechanical PTO 212 next to the engine 204 allows the accessories to be efficiently coupled to the engine 204 during engine use. However, in other examples, the transmission system 200 may include components other than the first and second gears 208, 210 between the internal combustion engine 204 and the mechanical PTO 212.

A ring gear 224 in a first planetary gear set 226 is rotationally coupled to the first shaft 206. Thus, engine rotational output drives rotation of the ring gear 224 in the first planetary gear set 226 or vice versa. As described herein, a planetary gear set is a gear set with a ring gear coupled to planet gears rotating on a carrier. The planet gears are also coupled to a sun gear. Each of the aforementioned meshes enable rotational energy transfer therebetween.

A clutch 228 is coupled to the first shaft 206. The clutch 228 is designed to coupled and decouple the first shaft 206 from a sun gear 230 in a second planetary gear set 232. To accomplish the coupling/decoupling functionality the clutch 228 may include friction plates, hydraulic mechanisms, toothed interfaces, etc. For instance, the clutch 228 may be a friction clutch with radially aligned friction plates, a dog clutch, a hydraulic clutch, and the like. The clutch 228 and the other clutches described herein may be pneumatically actuated, hydraulically actuated, electrically actuated, combinations thereof. It will also be appreciated that the other clutches described herein may be designed with any of the aforementioned styles, features, etc. Additionally, in one example, at least a portion of the clutches in the transmission system 200 may have a similar design. However, in other examples, the configurations of the clutches may vary from clutch to clutch. Factors taken into account when selecting the style of clutches used in the system may include packaging goals, expected operating torque range, engine size, electrical machine size, etc.

The second planetary gear set 232 further includes planet gears 234 rotating on a carrier 236. The planet gears 234 are rotationally coupled to the sun gear 230 and a ring gear 238 in the second planetary gear set 232. A brake 240 may be coupled to the ring gear 238, in one example. The brake 240 is designed to modulate the rotational speed of the ring gear 238. Thus, the brake 240 may selectively limit the speed of the ring gear 238. To facilitate the speed modulation the brake 240 may include a friction device (e.g., brake shoes, brake pads, and the like) interacting with the ring gear 238 to slow the gear. The force applied by the friction device may be varied to adjust (e.g., continuously adjust or discretely adjust) the rotational speed of the ring gear. Various styles of brakes may be used in different use-case embodiments such as a band brake, a disk brake, a drum brake, and the like.

The first planetary gear set 226 additionally includes a plurality of planet gears 242 rotating on a carrier 244. The carrier 244 in the first planetary gear set 226 is rotationally coupled to the carrier 236 in the second planetary gear set 232. The carrier 244 in the first planetary gear set 226 also may include an interface 248 rotationally to a gear 270 rotationally coupled to a clutch 272 on a shaft 274 (e.g., offset shaft). The clutch 272 is configured to rotationally couple and decouple the carrier 244 in the first planetary gear set 226 from the ring gear 238 in the second planetary gear set 232. Another gear 276 is coupled to the shaft 274 which is rotationally coupled to the second planetary gear set 232 by way of an interface 252. The interface 252 is shown comprising two gears 254. However, in other examples, the interface 252 may include one gear.

The first electrical machine 216 and the second electrical machine 218 may also be included in the transmission system 200. The first and second planetary gear sets 226, 232 may be axially interposed by the first and second electrical machines 216, 218.

The first electrical machine 216 includes a stator 256 and a rotor 258 coupled to a sun gear 260 of the first planetary gear set 226. Likewise, and the second electrical machine 218 includes a stator 262 and a rotor 264 coupled to the sun gear 230 of the second planetary gear set 232. Each pair of rotors and stators in the electrical machines is configured to electromagnetically interact with one another to rotate the sun gear to which they are attached and generate electrical energy responsive to receiving rotational input from the sun gear. Thus, the stators 256, 262 and the rotors 258, 264 may include cores, electromagnets (e.g., windings), permanents magnets, etc., to achieve the aforementioned functionality. The electrical machines may also include components such as housings, cooling systems, mounting structures, etc., in some embodiments.

A variety of suitable configurations for the first and second electrical machines 216, 218 may be used depending on the end-use design goals. For instance, the electrical machines may be an alternating current (AC) motor-generator. AC motor-generator types include asynchronous (e.g., squirrel cage and wound rotor) and synchronous style motors. Synchronous motor-generators such as one phase, three phase, more than three phases, etc. may be used in certain embodiments. The styles of synchronous motor-generators that may be deployed include permanent magnet, synchronous reluctance, hybrid synchronous (e.g., permanent magnet assisted synchronous reluctance), synchronous induction, and hysteresis. In one use-case scenario, an asynchronous motor-generator may be used due to its relatively low cost, low maintenance, and high efficiency. Continuing with the AC motor-generator use-case, a synchronous permanent magnet motor-generator may be utilized, in other instances, due to its relatively high conversion efficiency.

The first electrical machine 216 and the second electrical machine 218 may receive electric energy from an electrical energy storage device 266 by way of an inverter 268. The inverter 268 includes circuits and other components changing direct current (DC) to AC or vice-versa depending on the direction of current flow. To elaborate, the inverter 268 may convert current flowing to the electrical energy storage device 266 from the electrical machines 216, 218 to DC current. Conversely, the inverter 268 may convert current flowing to the electrical machines 216, 218 from the electrical energy storage device 266 to AC current. The inverter 268 may, in one example, not be configured to guarantee a zero-torque state for the first and second electrical machines 216, 218. Consequently, the cost of the inverter may be decreased when is does not include the circuitry and controls for bringing the electrical machines to zero-torque states. In such an example, the system may rely on a neutral clutch, described in greater detail herein, to bring the transmission output to a zero-torque state. In this way, torque is prevented from reaching the output. Consequently, the likelihood of unwanted power flow between the transmission and driveline may be reduced (e.g., avoided). For instance, in one non-limiting example, the chance of vehicle movement caused by the release of battery power to the electrical machines is reduced. In another non-limiting example, the neutral clutch may allow the likelihood of unwanted power transfer between the internal combustion engine and the driveline to be decreased. In yet another non-limiting example, the neutral clutch may allow the chance of unwanted braking force occurrence due to mechanical degradation to be reduced.

The inverter 268 is shown spaced apart from the electrical energy storage device 266. However, it will be appreciated that in certain embodiments, the inverter 268 may be integrated into the electrical energy storage device 266 or may be omitted from the system. The electrical energy storage device 266 may include batteries, capacitors, combinations thereof, and the like.

An electrical PTO 280 may also be coupled to the inverter 268. The electrical PTO 280 may comprise hardware such as electrical interfaces (e.g., sockets, plugs, capacitive charging devices, etc.) designed to electrically connect to one or more electrical accessories 281. The electrical accessories may include electrical pumps, electrical compressors, electrical tools, etc.

The inverter 268, electrical energy storage device 266, electrical PTO 280, and the first and second electrical machines 216, 218 may be coupled via suitable wired and/or wireless energy transfer mechanisms, indicated via lines 282. To elaborate, an electrical system may be provided to transfer electrical energy between the first and second electrical machines 216, 218, the electrical energy storage device 266, and the electrical PTO 280. The electrical system may include the inverter 268, cables (e.g., high voltage cables), distribution boxes, etc.

The first and second planetary gear sets 226, 232 are, in the illustrated embodiment, positioned axially between the first and second electrical machines 216, 218. In this way, the transmission system may achieve a compact arrangement. Additionally, the engine's output shaft 206 and rotational axes of the electrical machines 216, 218 and the planetary gear sets 226, 232 are coaxial, enabling system compactness to be further increased and allowing the transmission to be efficiently installed in the vehicle. However, in other embodiments, the planetary gear sets may be positioned axially outboard of the electrical machines and, in some instances, the engine, electrical machines, and/or planetary gear sets may not be coaxially arranged.

A clutch 284 (e.g., neutral clutch) configured to selectively rotationally connect to the carriers 244, 236 of the first and second planetary gear sets 226, 232, respectively, is also provided in the transmission system 200. For instance, the clutch 228 may be a friction clutch or a hydraulic clutch enabling this rotational connection/disconnection functionality. Specifically, in one example, the clutch 228 may be a hydraulically operated dog clutch. However, a pneumatic or an electrically actuated clutch may be used, in other examples. The clutch 228 may be designed to automatically open in case of over-torque to protect the transmission and other components. To elaborate, the clutch 284 is rotationally coupled to a shaft 288 connected to the drive axle 286 and a shaft 290 connected to the carrier 244 of the first planetary gear set 226. Thus, the clutch 284 may interrupt the power flow to the drive axle 286 when wanted. To elaborate, the clutch 284 may be configured to disconnect the carriers 244, 236 from the drive axle 286, resulting in the disconnection of the first and second planetary gear sets 226, 232 as well as the first and second electrical machines 216, 218 from the drive axle. In this way, the system's modal capabilities are expanded by providing an efficient neutral mode of system operation, thereby increasing system adaptability. Furthermore, the clutch 284 and the first and second planetary gear sets 226, 232 may be coaxially arranged to increase system compactness in comparison to off-axis clutch arrangements, in some examples. Increasing system compactness may also allow the transmission system to be used in a wider variety of vehicles which may for example have compact packaging. It will be appreciated that the clutch 284 may be referred to as a first clutch, the clutch 272 may be referred to as a second clutch, and the clutch 228 may be referred to as a third clutch, in one example.

A controller, such as the controller 152 shown in FIG. 1, may be used to control components in the transmission system 200. The controllable components may include the engine 204, the first and second electrical machines 216, 218 by way of the inverter 268, the clutch 228, the brake 240, the clutch 272, the clutch 284, the mechanical PTO 212, the electrical energy storage device 266, and the electrical PTO 280. To elaborate, the transmission system 200 may be operated in different modes (e.g., a low, a mid, or a high mode depending on which clutches are opened or closed). It will be understood that each mode has a certain speed, torque, and efficiency range. In one mode driving power can flow to the axle while one electrical machine is generating a rotational output and the other electrical machine is generating electrical energy. The modes may be transitioned between based on a variety of operating conditions such as vehicle speed, accelerator pedal position, brake pedal position, throttle position, and the like.

FIG. 3 shows another example of a transmission system 300 in a vehicle 302. The transmission system 300 includes several components in the transmission system 200, shown in FIG. 2, such as a first planetary gear set 304, a second planetary gear set 306, a first electrical machine 308, a second electrical machine 310, and an electrical PTO 314. These common components may have a similar structure and function. As such, redundant description of these components is omitted for brevity. However, the vehicle 302 shown in FIG. 3 is a battery electric vehicle (BEV) where an engine is omitted. Instead, a mechanical PTO 318 is coupled to a shaft 320. In one example, a clutch may be provided between the mechanical PTO 318 and the shaft 320. In this way, the PTO functionality in the BEV is expanded, allowing additional accessories to be driven by the transmission, if wanted.

FIG. 4 shows a method 400 for operation of a transmission system. The method 400 may be implemented by any of the transmission systems described above with regard to FIGS. 1-3. However, in other examples, the method may be implemented by other suitable transmission systems. At least a portion of the method steps may be implemented as instructions stored in non-transitory memory executable by a processor in a controller (e.g., controller 152, shown in FIG. 1).

At 402, the method determines operating conditions. These operating conditions may include vehicle speed, wheel speed, engine speed, pedal position, vehicle load, clutch configurations, etc. It will be understood that the aforementioned conditions may be ascertained from sensor inputs, using modeled data, etc.

Next at 404, the method determines whether to bring the transmission output to a zero-torque state. Such a determination may be based on operating conditions such as a period of time the vehicle remains at rest, a fault state, etc. For instance, if the vehicle remains at zero velocity for greater than 30 seconds, 1 minute, 2 minutes, or another suitable threshold value, it may be determined that the transmission output should be placed in a zero-torque state. In other examples, responsive to the initiation of a park mode in the vehicle, the transmission's output may be brought to a zero-torque state. In yet another example, a fault state may occur in the vehicle and the transmission output may be brought to a zero-torque state in response to indication of the fault state.

If it is determined that the transmission output should not be placed in a zero-torque state (NO at 404) the method includes at 406, maintaining the current transmission control strategy. For instance, the transmission may maintain the neutral clutch in a closed configuration where rotational energy transfer between the transmission and the drive axle is permitted. After 406, the method may return to 402.

However, if it is determined that the transmission output should be brought to a zero-torque state (YES at 404) the method includes at 408, opening the neutral clutch to bring the transmission to the zero-torque state. In this way, the neutral clutch is disengaged to prevent rotational energy transfer between the neutral clutch and the drive axle. Consequently, the chance of unwanted power flow between the driveline and the transmission is reduced. For instance, in one non-limiting example, the neutral clutch may allow the chance of unwanted vehicle movement caused by the unwanted release of battery power to the electrical machines to be reduced. In another non-limiting example, the neutral clutch may allow the chance of unwanted vehicle motion caused by unwanted power transfer from the internal combustion engine to the driveline. In yet another non-limiting example, the neutral clutch may allow the chance of unwanted braking force occurrence caused by mechanical degradation to be reduced.

The technical effect of the methods and systems for the transmission described herein is a reduction in the chance of unwanted power flow between the transmission and the driveline.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a vehicle transmission system is provided that comprises a first planetary gear set rotationally coupled to a second planetary gear set; a first electrical machine rotationally coupled to a gear in the first planetary gear set; a second electrical machine rotationally coupled to a gear in the second planetary gear set; and a first clutch configured to selectively disconnect the first and second planetary gear sets from a drive axle.

In another aspect, a method for operating a vehicle transmission system is provided that comprises during a first operating condition, operating a clutch to rotationally disconnect a first planetary gear set and a second planetary gear set from a drive axle; and during a second operating condition, operating the clutch to rotationally connect the first planetary gear set and the second planetary gear set to the drive axle; wherein the first planetary gear set is rotationally coupled to a first electrical machine; and wherein the second planetary gear set is rotationally coupled to a second electrical machine.

In yet another aspect, an electro-mechanical infinitely variable transmission (EMIVT) system is provided that comprises a first planetary gear set rotationally coupled to a second planetary gear set; a first electrical machine rotationally coupled to a sun gear in the first planetary gear set; a second electrical machine rotationally coupled to a sun gear in the second planetary gear set; a neutral clutch configured to selectively disconnect the first and second planetary gear sets from a drive axle; an inverter electrically coupled to the first and second electrical machines; and a controller including executable instructions stored in non-transitory memory that, during an operating condition, cause the controller to: operate the neutral clutch to disconnect the first and second planetary gear sets from the drive axle.

In any of the aspects or combinations of the aspects, the vehicle transmission system may further comprise an electrical energy storage device electrically coupled to the first and second electrical machines; and a controller including executable instructions stored in non-transitory memory that cause the controller to: operate the first clutch to disconnect the first and second planetary gear sets from the drive axle.

In any of the aspects or combinations of the aspects, the controller may include executable instructions stored in the non-transitory memory that the controller to: operate the first clutch to connect the first and second planetary gear sets to the drive axle.

In any of the aspects or combinations of the aspects, operating the first clutch to disconnect the first and second planetary gear sets from the drive axle may bring a transmission output to a zero-torque state without operation of an inverter electrically coupled to the first and second electrical machines.

In any of the aspects or combinations of the aspects, the vehicle transmission system may further comprise an inverter electrically coupled to the first and second electrical machines and an electrical energy storage device.

In any of the aspects or combinations of the aspects, the inverter may not be configured to guarantee a zero-torque state for the first and second electrical machines.

In any of the aspects or combinations of the aspects, the vehicle transmission system may further comprise an electrical power take-off electrically coupled to the inverter.

In any of the aspects or combinations of the aspects, the vehicle transmission system may further comprise a second clutch configured to selectively rotationally couple a carrier in the first planetary gear set from a ring gear in the second planetary gear set; a third clutch configured to selectively rotationally couple an input shaft to the second planetary gear set; and a brake coupled to the second planetary gear set.

In any of the aspects or combinations of the aspects, the vehicle transmission system may further comprise a mechanical power take-off rotationally coupled to an engine, wherein the first planetary gear set is rotationally coupled to the engine.

In any of the aspects or combinations of the aspects, the first planetary gear set, the second planetary gear set, the first electrical machine, the second electrical machine, and the first clutch may be arranged co-axial to one another.

In any of the aspects or combinations of the aspects, the vehicle transmission may be an electro-mechanical infinitely variable transmission (EMIVT).

In any of the aspects or combinations of the aspects, operating the clutch to rotationally disconnect the first planetary gear set and the second planetary gear set from the drive axle may comprise bringing an output of the vehicle transmission to a zero-torque state.

In any of the aspects or combinations of the aspects, the vehicle transmission system may comprise an inverter electrically coupled to the first and second electrical machines and an electrical energy storage device and wherein the inverter is not configured to guarantee a zero-torque state for the first and second electrical machines.

In any of the aspects or combinations of the aspects, the EMIVT may further comprise an electrical energy storage device electrically coupled to the inverter and wherein the operating condition is a condition where a period of time the vehicle remains at rest exceeds a threshold value and/or a fault state condition.

In any of the aspects or combinations of the aspects, the inverter may not be configured to guarantee a zero-torque state for the first and second electrical machines.

In any of the aspects or combinations of the aspects, the EMIVT may further comprise an electrical power take-off electrically coupled to the inverter; and a mechanical power take-off rotationally coupled to an engine, wherein the engine is rotationally coupled to the first planetary gear set.

In another representation, an electro-mechanical infinitely variable transmission is provided that comprises two planetary gear sets each rotationally coupled to a different motor-generator and a neutral clutch configured to rotationally disengage the two planetary gear sets from a drive axle and spin down the motor-generators to reach a zero-torque state, wherein the planetary gear sets, the motor-generators, and the neutral clutch are coaxially positioned.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the actuators, sensors, and other vehicle hardware. Further, portions of the methods may be change a state of a device. The specific routines described herein may represent one or more of any number of processing strategies such as interrupt-driven, event-driven, multi-threading, multi-tasking, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeated depending on the particular strategy in use. Further, the described actions, operations and/or functions may graphically represent code to be programmed into non-transitory memory of the computer readable storage medium in the vehicle control system, where the described actions are carried out by executing the instructions in a system including the various vehicle hardware components in combination with the electronic controller. One or more of the method steps described herein may be omitted, if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electrical machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle transmission system, comprising:
   a first planetary gear set rotationally coupled to a second planetary gear set;
   a first electrical machine rotationally coupled to a gear in the first planetary gear set;
   a second electrical machine rotationally coupled to a gear in the second planetary gear set; and
   a first clutch configured to selectively disconnect the first and second planetary gear sets from a drive axle.

2. The vehicle transmission system of claim 1, further comprising:
   an electrical energy storage device electrically coupled to the first and second electrical machines; and
   a controller including executable instructions stored in non-transitory memory that cause the controller to:
      operate the first clutch to disconnect the first and second planetary gear sets from the drive axle.

3. The vehicle transmission system of claim 2, wherein the controller includes executable instructions stored in the non-transitory memory that cause the controller to:
   operate the first clutch to connect the first and second planetary gear sets to the drive axle.

4. The vehicle transmission system of claim 2, wherein operating the first clutch to disconnect the first and second planetary gear sets from the drive axle brings an output of the vehicle transmission to a zero-torque state without operation of an inverter electrically coupled to the first and second electrical machines.

5. The vehicle transmission system of claim 1, further comprising an inverter electrically coupled to the first and second electrical machines and an electrical energy storage device.

6. The vehicle transmission system of claim 5, wherein the inverter is not configured to guarantee a zero-torque state for the first and second electrical machines.

7. The vehicle transmission system of claim 5, further comprising an electrical power take-off electrically coupled to the inverter.

8. The vehicle transmission system of claim 1, further comprising:
   a second clutch configured to selectively rotationally couple a carrier in the first planetary gear set from a ring gear in the second planetary gear set;
   a third clutch configured to selectively rotationally couple an input shaft to the second planetary gear set; and
   a brake coupled to the second planetary gear set.

9. The vehicle transmission system of claim 1, further comprising a mechanical power take-off rotationally coupled to an engine, wherein the first planetary gear set is rotationally coupled to the engine.

10. The vehicle transmission system of claim 1, wherein the first planetary gear set, the second planetary gear set, the first electrical machine, the second electrical machine, and the first clutch are arranged co-axial to one another.

11. The vehicle transmission system of claim 1, wherein the vehicle transmission is an electro-mechanical infinitely variable transmission (EMIVT).

12. An electro-mechanical infinitely variable transmission (EMIVT) system, comprising:
   a first planetary gear set coupled to a second planetary gear set;
   a neutral clutch configured to selectively disconnect the first and second planetary gear sets from a drive axle;
   an inverter electrically coupled to a first electrical machine and a second electrical machine; and
   wherein the first electrical machine is coupled to the first planetary gear set and the second electrical machine is coupled to the second planetary gear set;
   a controller including executable instructions stored in non-transitory memory that, during an operating condition, cause the controller to:
      operate the neutral clutch to disconnect the first and second planetary gear sets from the drive axle.

13. The EMIVT system of claim 12, further comprising an electrical energy storage device electrically coupled to the inverter and wherein the operating condition is a condition where a period of time a vehicle remains at rest exceeds a threshold value and/or a fault state condition.

14. The EMIVT system of claim 12, wherein the inverter is not configured to guarantee a zero-torque state for the first and second electrical machines.

15. The EMIVT system of claim 12, further comprising:
- an electrical power take-off electrically coupled to the inverter; and
- a mechanical power take-off rotationally coupled to an engine, wherein the engine is rotationally coupled to the first planetary gear set.

* * * * *